United States Patent [19]

Hirose et al.

[11] Patent Number: 4,837,401

[45] Date of Patent: Jun. 6, 1989

[54] CURABLE POLYMER COMPOSITION COMPRISING ORGANIC POLYMER HAVING SILICON-CONTAIING REACTIVE GROUP

[75] Inventors: Toshifumi Hirose; Sadao Yukimoto; Katsuhiko Isayama, all of Kobe, Japan

[73] Assignee: Kanegafuchi Chemical Industry, Co., Ltd., Japan

[21] Appl. No.: 807,842

[22] Filed: Dec. 11, 1985

[30] Foreign Application Priority Data

Dec. 12, 1984 [JP] Japan .................. 58-263293

[51] Int. Cl.$^4$ .......................... C08F 8/42; C08F 30/08
[52] U.S. Cl. .................. 525/364; 525/326.5; 528/18
[58] Field of Search .............. 525/475, 326.5, 364; 526/279, 190; 528/18

[56] References Cited

U.S. PATENT DOCUMENTS

| | | | |
|---|---|---|---|
| 3,527,728 | 9/1970 | Gibbon et al. | 525/475 |
| 4,478,990 | 10/1984 | Kohno et al. | 525/326.5 |
| 4,614,777 | 9/1986 | Kania | 526/279 |

FOREIGN PATENT DOCUMENTS

| | | | |
|---|---|---|---|
| 887598 | 11/1979 | U.S.S.R. | 525/475 |
| 730764 | 4/1980 | U.S.S.R. | 525/475 |
| 1058385 | 2/1967 | United Kingdom | |

Primary Examiner—Joseph L. Schofer
Assistant Examiner—Peter F. Kulkosky
Attorney, Agent, or Firm—Wegner & Bretschneider

[57] ABSTRACT

A curable polymer composition comprising (A) 100 parts by weight of an organic polymer having at least one silicon-containing reactive group of the formula:

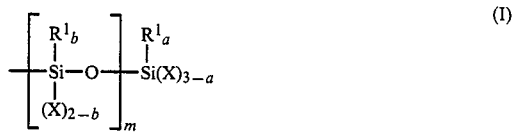

wherein $R^1$ is, the same or different, a $C_1$–$C_{20}$ monovalent hydrocarbon group or a triorganosiloxy group of the formula:

$$(R')_3SiO— \qquad (II)$$

in which $R'$ is, the same or different, a $C_1$–$C_{20}$ monovalent hydrocarbon group; X is a hydroxyl group or a hydrolyzable group provided that when the number of Xs in the group (I) is at least 2, Xs are the same or different; a is 0, 1, 2 or 3; b is 0, 1 or 2; and m is an integer of 1 to 18, and (B) 0.01 to 10 parts by weight of a curing catalyst selected from the compounds of the formulas:

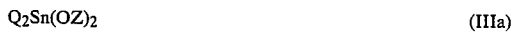

and

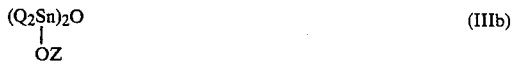

wherein Q is a $C_1$–$C_{20}$ monovalent hydrocarbon group; and Z is, the same or different, a $C_1$–$C_{20}$ monovalent hydrocarbon group or an organic group having a functional residue which can form a coordinate bond with Sn atom, which can be quickly cured and particularly useful as a pressure sensitive adhesive and a sealing material.

6 Claims, No Drawings

CURABLE POLYMER COMPOSITION COMPRISING ORGANIC POLYMER HAVING SILICON-CONTAIING REACTIVE GROUP

FIELD OF THE INVENTION

The present invention relates to a curable polymer composition comprising an organic polymer having at least one silicon-containing reactive group in a molecule, which composition is readily cured.

BACKGROUND OF THE INVENTION

An organic polymer having at least one silicon-containing reactive group is known in the field. This polymer is similar to moisture curable polysiloxane in that it cures by forming siloxane linkage, but is different in that it contains an organic polymer in the backbone chain. One example of such polymer is a polymer of the formula:

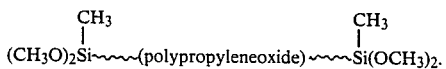

This polymer can cure by forming siloxane linkage in the presence of moisture.

The organic polymer having at least one silicon-containing reactive group can be used as a pressure sensitive adhesive and a sealant (of. U.S. Pat. Nos. 4,463,115 and 3,971,751).

Usually, a curing catalyst is used for curing the organic polymer having at least one silicon-containing reactive group. As the curing catalyst, there are known various compounds such as titanate esters (e.g. tetra-n-butoxytitanate), tin carboxylate compounds (e.g. dibutyltin dilaurate and tin dioctylate) and amines. Although these catalysts are selected and used according to the final use and application of the curable composition, generally they have low catalytic activity and only provide a low curing rate. Therefore, a highly active curing catalyst which can cure the composition at a high rate is desired.

In the case where the polymer is used as the pressure sensitive adhesive, the polymer is required to cure in a very short period of time, i.e., within one minute, for effective production of the adhesive. Among the curing catalysts described above, titanate esters and a combination of tin carboxylate and amine have fairly high curing activity. However, the pressure sensitive adhesive containing titanate ester has drawbacks such as discoloring of the adhesive. The pressure sensitive adhesive containing tin carboxylate and amine has drawbacks such as discoloring and odor due to amine, and bleeding of amine on the surface of the pressure sensitive adhesive which results in change of adhesive properties.

In the case where the polymer is used as the sealant, the curing catalyst having high activity is required for shorter term of works. The sealant composition containing tin carboxylate and amine has high curing rate, but has low adhesivity to a substrate which is one of the important properties of the sealant. Moreover, the sealant composition containing tin carboxylate has such a drawback that the activity of the catalyst is decreased after the storage of the composition.

SUMMARY OF THE INVENTION

An object of the present invention is to provide a curable polymer composition comprising an organic polymer having at least one silicon-containing group in a molecule and a curing catalyst which can cure the polymer at a high curing rate.

Another object of the present invention is to provide a curable polymer composition having a high curing rate which is suitable for a pressure sensitive adhesive.

Further object of the present invention is to provide a curable polymer composition having a high curing rate even after long term storage.

Still another object of the present invention is to provide a curable polymer composition having a high curing rate and high adhesivity to a substrate.

Accordingly, the present invention relates to a curable polymer composition comprising (A) 100 parts by weight of an organic polymer having at least one silicon-containing reactive group of the formula:

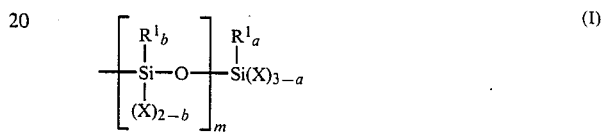

wherein $R^1$ is, the same or different, a $C_1$–$C_{20}$ monovalent hydrocarbon group or a triorganosiloxy group of the formula:

$$(R')_3SiO— \qquad (II)$$

in which $R'$ is, the same or different, a $C_1$–$C_{20}$ monovalent hydrocarbon group; X is a hydroxyl group or a hydrolyzable group provided that when the number of Xs in the group (I) is at least 2, Xs are the same or different; a is 0, 1, 2 or 3; b is 0, 1 or 2; and m is an integer of 1 to 18, and (B) 0.01 to 10 parts by weight of a curing catalyst selected from the compounds of the formulas:

and

wherein Q is a $C_1$–$C_{20}$ monovalent hydrocarbon group; and Z is, the same or different, a $C_1$–$C_{20}$ monovalent hydrocarbon group or an organic group having a functional residue which can form a coordinate bond with Sn atom.

DETAILED DESCRIPTION OF THE INVENTION

The organic polymer (A) having at least one silicon-containing reactive group in a molecule comprises a backbone chain consisting of, for example, polyalkyleneoxide, ether-ester block copolymer, vinyl polymer, vinyl type copolymer and diene type polymer and has at least one silicon-containing reactive group (I).

The silicon-containing reactive group (I) can proceed a condensation reaction in the presence of a catalyst and optionally in the presence of water or moisture or a cross-linking agent.

When at least two $R^1$ groups are present in the group (I), they may be the same or different. Specific examples of the hydrocarbon group of $R^1$ are an alkyl group (e.g.

methyl, ethyl and the like), a cycloalkyl group (e.g. cyclohexyl and the like), an aryl group (e.g. phenyl and the like) and an aralkyl group (e.g. benzyl and the like). $R^1$ may be a triorganosiloxy group (II). Among them, methyl and phenyl are preferred.

Specific examples of the hydrolyzable group of X are halogen, hydride, alkoxy, acyloxy, ketoxymate, amino, amide, aminoxy, mercapto, alkenyloxy and the like. Among them, alkoxy is preferred.

The silicon-containing group (I) preferably has at least one X, more preferably 1 to 4 Xs.

The organic polymer (A) should have at least one silicon-containing reactive group (I) per molecule, and preferably 1.2 to 6 reactive groups per molecule on the average.

The silicon-containing reactive group (I) chemically bonds to the backbone chain of the organic polymer. It is not preferable for the silicon-containing reactive group to be bonded to the backbone chain through an bonding structure of the formula: ≡Si—O—C≡, since such structure tends to be cleaned by water. A preferable bonding structure between the silicon atom of the reactive group and the backbone chain or its side chain is, for example, a structure of the formula: ≡Si—C≡. Most preferably, the reactive group is bonded to the backbone chain in the following chemical structure:

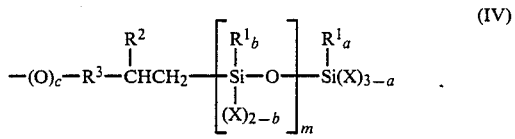

wherein $R^1$, X, a, b and m are the same as defined above. $R^2$ is a hydrogen atom or a $C_1$-$C_{20}$ monovalent organic group; $R^3$ is a $C_1$-$C_{20}$ divalent organic group; and c is 0 or 1.

When the alkyleneoxide polymer constitutes the backbone chain polymer of the organic polymer (A), it preferably comprises repeating units of the formula:

wherein $R^4$ is a $C_1$-$C_8$, preferably $C_1$-$C_4$ divalent hydrocarbon group. Specific examples of the divalent group $R^4$ are those of the formulas:
—CH$_2$—, —CH$_2$CH$_2$—, —CH(CH$_3$)CH$_2$—, —CH(C$_2$H$_5$)CH$_2$—, —C(CH$_3$)$_2$CH$_2$— and —CH$_2$CH$_2$CH$_2$CH$_2$—. Among them, —CH(CH$_3$)CH$_2$— is preferred.

The backbone chain of the alkyleneoxide polymer may comprise one or more kinds of repeating units.

The alkylene oxide polymer has a molecular weight of 500 to 30,000, preferably 3,000 to 15,000. Particularly, one having a silicon-containing reactive group at the end of molecule and a molecular weight of 3,000 to 15,000 is desirable.

As the backbone chain of the organic polymer (A), an elastic polymer comprising a vinyl compound and/or a diene compound can be used. Specific examples of such polymer are polybutadiene, styrene/butadiene copolymer, acrylonitrile/butadiene copolymer, acrylate/butadiene copolymer, ethylene/butadiene copolymer, vinylpyridine/butadiene copolymer, ethylene/propylene copolymer, ethylene/vinyl acetate copolymer, ethylene/acrylate copolymer, polyisoprene, styrene/isoprene copolymer, isobutylene/isoprene copolymer, polychloroprene, styrene/chloroprene copolymer, acrylonitrile/chloroprene copolymer, polyisobutylene, polyacrylate, polymethacrylate and the like. Among them, the organic polymer (A) comprises at least 50% by weight of acrylate or methacrylate (hereinafter referred to as "(meth)acrylate") is preferred. Preferred (meth)acrylate is ester of (meth)acrylic acid with a straight or branched $C_2$-$C_{12}$ alkyl or cycloalkyl alcohol. Specific examples of (meth)acrylate are n-butyl (meth)acrylate, 2-ethylhexyl (meth)acrylate, ethyl (meth)acrylate, propyl (meth)acrylate, isobutyl (meth)acrylate, amyl (meth)acrylate, hexyl (meth)acrylate, cyclohexyl (meth)acrylate, n-octyl (meth)acrylate, n-decyl (meth)acrylate and the like.

The vinyl type polymer has a molecular weight of 500 to 1,000,000, preferably 2,000 to 500,000. Particularly, one having a molecular weight of 3,000 to 15,000 is preferred when the silicon-containing group is present as a terminal group.

The organic polymer (A) may be used alone or as a mixture with at least one other oragnic polymer (A). For example, a mixture of the alkyleneoxide polymer and the vinyl type polymer such as polyalkyl acrylate can be used. Further, a polymer prepared by polymerizing the vinyl compound such as alkyl acrylate in the presence of the alkyleneoxide polymer can be used.

The organic polymer (A) having a backbone chain comprising the alkyleneoxide polymer or the ether-ester block copolymer may be prepared by one of the methods described in U.S. Pat. Nos. 3,592,795 and 3,408,321, Japanese Patent Publication No. 32673/1974, Japanese Patent Kokai Publication (unexamined) Nos. 156599/1975, 73561/1976, 6096/1979, 13768/1980, 82123/1980, 123620/1980, 125121/1980, 131021/1980, 131022/1980, 135135/1980 and 137129/1980.

The organic polymer (A) having a backbone chain comprising the vinyl type polymer or copolymer may be prepared by one of the method described in U.S. Pat. No. 3,453,230, Japanese Patent Publication No. 28301/1976 and Japanese Patent Kokai Publication (unexamined) No. 179210/1982.

The organic polymer (A) having a backbone chain comprising the diene type polymer may be prepared by one of the method described in Japanese Patent Publication No. 17553/1970 and Japanese Patent Kokai Publication (unexamined) No. 1839/1972.

The curing catalyst (IIIa) or (IIIb) to be used according to the present invention initiates the condensation reaction of the silicon-containing reactive groups of the organic polymer (A) in the presence of absence of water or moisture to cure the polymer (A). The catalyst (IIIa) in which Z is the organic group having the functional residue which can form the coordinate bond with Sn atom can be used. An example of such catalyst is a compound represented by the formula:

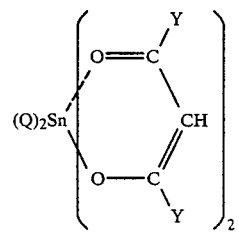

wherein Q is, the same or different, a $C_1$-$C_{20}$ monovalent hydrocarbon group; and Y is, the same or different, a $C_1$-$C_8$ hydrocarbon group, halogenated hydrocarbon group, cyanoalkyl group, alkoxy group, halogenated alkoxy group, cyanoalkoxy group or amino group.

Specific examples of the curing catalyst are those of the formulas:

$(C_4H_9)_2Sn(OCH_3)_2$, $(C_4H_9)_2Sn(OC_4H_9)_2$, $(C_4H_9)_2Sn(OC_8H_{17})_2$,

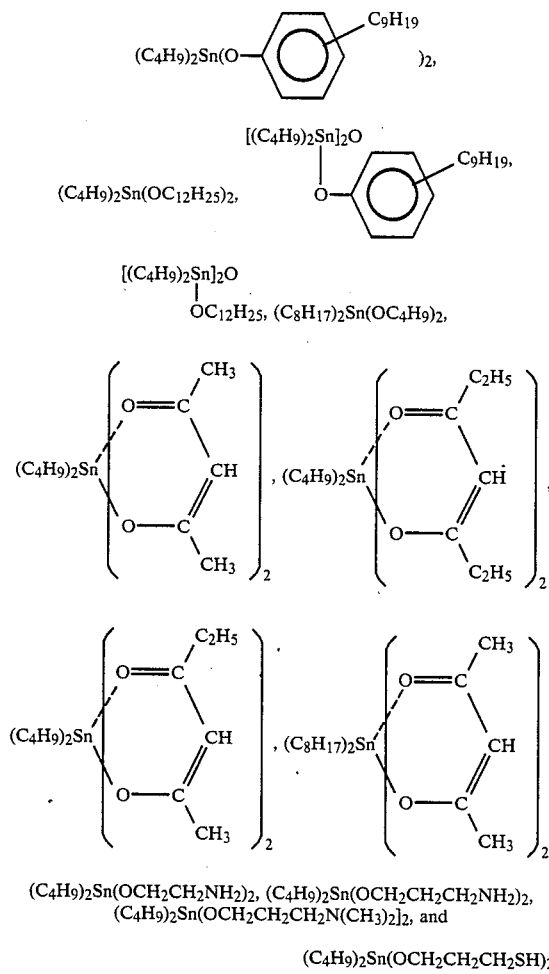

$(C_4H_9)_2Sn(OCH_2CH_2NH_2)_2$, $(C_4H_9)_2Sn(OCH_2CH_2CH_2NH_2)_2$, $(C_4H_9)_2Sn(OCH_2CH_2CH_2N(CH_3)_2]_2$, and $(C_4H_9)_2Sn(OCH_2CH_2CH_2SH)_2$.

The catalyst (B) may be used alone or mixture with at least one of other catalysts (B). The amount of the catalyst to be used is 0.01 to 10 parts by weight per 100 parts by weight of the organic polymer (A).

The curing catalyst used according to the present invention has higher curing activity than the conventionally used organotin compound. Moreover, the curing catalyst used according to the present invention does not discolor the cured polymer.

The composition of the invention finds various application including a pressure sensitive adhesive composition and a sealing material.

When the composition of the invention is used as the pressure sensitive adhesive, it is applied on a tape, sheet, label or foil. Namely, the composition in the form of a non-solvent type liquid, a solution, an emulsion or a hot melt type may be applied on a substrate such as a film of a synthetic or modified natural resin, paper, fabrics, metal foil, metallized plastic foil, asbestos or glass fiber fabrics and cured at a room temperature or an elevated temperature with optional exposure to water or moisture.

To regulate the adhesion characteristics of the composition, a tackifier resin may be added to the composition. Specific examples of the tackifier resin are resins having a polar group such as rosin ester resin, phenol resin, xylene resin, xylene-phenol resin, terpene-phenol resin; petroleum resins with relatively small polarity such as aromatic polymer, aliphatic-aromatic copolymer and alicyclic polymer; cumaron resin; low molecular weight polystyrene; terpene resin; and the like. Commercially available tackifier resins are as follows:

Resins with comparatively small polarity:

Petrosin 80, Tackace A 100 and FTR 6100 (Mitsui Petrochemical Industries Co., Ltd., Japan), Neopolymer S (Nippon Petrochemical Co., Ltd., Japan), Quinton 1500 (Nippon Zeon Co., Ltd. Japan), Picolasteck A 75 (Hercules Inc.), and Cumaron G-90 (Nittetsu Chemical Co., Ltd., Japan).

Resins having a polar group:

YS polystar T-115 and S-145 (Yasuhara Oil and Fat Co., Ltd., Japan), Steberite-ester 7 (Hercules Inc.), and Neopolymer E-100 (Nippon Petrochemical co., Ltd., Japan).

When the composition of the invention is used as the sealing material, optionally added is a plasticizer, a filler, a reinforcement, an antisagging agent, a colorant, an anti-aging agent, an adhesion promoting agent, a property modifier, etc.

Specific examples of the plasticizer are phthalates (e.g. dibutyl phthalate, diheptyl phthalate, di(2-ethylhexyl) phthalate, butyl benzyl phthalate, butyl phthalyl glycolate, etc.); non-aromatic dibasic acid esters (e.g. dioctyl adipate, dioctyl sebacate, etc.); esters of polyalkylene glycol (e.g. diethylene glycol dibenzoate, triethylene glycol dibenzoate, etc.); phosphates (e.g. tricresyl phosphate, tributyl phosphate, etc.); chlorinated paraffines; hydrocarbon oils (e.g. alkyldiphenyl, partially hydrogenated terphenyl, etc.), which are used alone or as a mixture thereof. The plasticizer may be added in the course of the polymerization.

Specific examples of the filler or reinforcement are heavy or light calcium carbonate, calcium carbonate having a surface treated with an aliphatic acid, a resin acid, a cationic surfactant, anionic surfactant and the like, magnesium carbonate, talc, titanium oxide, barium sulfate, alumina, metal powder (e.g. aluminum, zinc and iron powder), bentonite, kaolin clay, fumed silica, silica powder, and carbon black. When a transparent filler or reinforcement such as fumed silica is used, a transparent sealing material is prepared.

Specific examples of the antisagging agent are hydrogenated castor oil, and metal soap such as calcium stearate, aluminum stearate and barium stearate. the antisagging agent may not be used depending on the end use and/or the presence of the filler or reinforcement.

As the colorant, conventional organic or inorganic pigment or dye may be used.

Specific examples of the property modifier are silane coupling agents such as alkylalkoxy silanes (e.g. methyltrimethoxysilane, dimethyldimethoxysilane, trimethylmethoxysilane, n-propyltrimethoxysilane, etc.); alkylisopropenoxysilanes (e.g. dimethyldiisopropenoxysilane, methyltriisopropenoxysilane, γ-glycidoxypropylmethyldiisopropenoxysilane, etc.); alkoxysilane having a functional group (e.g. γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane, etc.); silicone varnish; polysiloxanes, etc. Addition of the property modifier can increase or decrease the hardness of the cured composition.

The adhesivity promoting agent is not necessarily added to the composition of the invention, since the polymer used according to the present invention itself has enough adhesivity to be applied on the surface of the various substrates such as glass, ceramics, metal and the like, or the polymer can be adhered to various surfaces by the use of a primer. Specific examples of the adhesivity promoting agent are epoxy resins, phenol resins, silane coupling agents, alkyl titanate, aromatic polyisocyanate, etc. and mixtures thereof.

The sealing material comprising the polymer composition of the invention may be formulated as a moisture curing one-pack type one by compounding all the components and stored in a sealed state. Alternatively, the sealing material may be formulated as a two-pack type one consisting of the polymer composition and a curing mixture containing the curing catalyst, the filler, the plasticizer, water and other suitable component(s) except the polymer, which are mixed in use.

In case of the one-pack type sealing material, since all the components are beforehand compounded, preferably, any component including water or moisture should be dehydrated before compounding, or the components are compounded with removing water or moisture, for example, under reduced pressure.

In case of the two-pack type one, since the polymer composition does not contain any curing catalyst, either the polymer composition and the curing mixture may contain a slight amount of water or moisture. However, for longer storage of the sealing material, it is advisable to dehydrate it. Solid components such as powder may be heated to dehydrate, and liquid components may be dehydrated under reduced pressure or with a desiccant such as synthetic zeolites, active alumina and silica gel. Alternatively or in addition, water or moisture can be removed by adding a small amount of isocyanate compound to react the isocyanate group with water or moisture. Furthermore, storage stability of the sealing material is improved by the addition of lower alcohol (e.g. methanol, ethanol, etc.) or alkoxysilanes (e.g. n-propyltrimethoxysilane, vinylmethyldimethoxylsilane, γ-mercaptopropylmethyldimethoxysilane, γ-glycidoxypropyltrimethoxysilane, etc.).

To improve processability of the polymer composition and/or to reduce the viscosity of the composition, a solvent may be used. Specific examples of the solvent are aromatic hydrocarbons (e.g. toluene, xylene, etc.), esters (e.g. ethyl acetate, butyl acetate, amyl acetate, cellosolve acetate, etc.), and ketones (e.g. methyl ethyl ketone, methyl isobutyl ketone, diisobutyl ketone, etc.).

In addition to the pressure sensitive adhesive and the sealing material, the polymer composition of the invention may be used as an adhesive, a templating agent, an insulating material, a foaming material, a spraying material, and the like.

The present invention will be hereinafter explained further in detail by following examples, in which % and parts are by weight unless otherwise indicated.

PREPARATION EXAMPLE 1

(Preparation of polyalkyleneoxide having silicon-containing reactive group)

In an autoclave equipped with a stirrer, polypropyleneoxide 98% of the terminal groups of which being allylether groups (having average molecular weight, 8,000 and produced from polypropylene glycol) (800 g) and methyldimethoxysilane (20 g) were charged. Then, a solution of chloroplatinic acid (8.9 g of $H_2PtCl_6 \cdot H_2O$ dissolved in a mixture of 18 ml of isopropyl alcohol and 160 ml of tetrahydrofuran) (0.34 ml) was added, and the reaction was carried out at 80° C. for 6 hours.

An amount of the unreacted silane was monitored by gaschromatography and infrared spectrum analysis to find that 84 % of the terminal groups were reacted and there were obtained polypropyleneoxide having a terminal group of the formula:

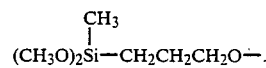

PREPARATION EXAMPLE 2

(Preparation of acrylate polymer having silicon-containing reactive group)

To a mixture of n-butyl acrylate (128 g, 1.0 mole), γ-methacryloxypropylmethyldimethoxysilane (3.48 g, 0.015 mole) and γ-mercaptopropylmethyldimethoxysilane (2.46 g, 0.015 mole), α,α'-azobisisobutyronitrile (0.25 g) was added and dissolved. A part of the solution (30 g) was charged in a 300 ml four-necked flask equipped with a condenser and a dropping funnel the interior of which flask was replaced with nitrogen, and gradualy heated on an oil bath kept at 70° C. Then, the exothermic polymerization was initiated and the viscosity of the solution increased. The residual solution was dropwise added over 2.5 hours. After the completion of the addition of the solution, the reaction mixture was stirred for 1 hour to complete the polymerization to obtain a colorless transparent viscous liquid. Viscosity (23° C.), 350 poise. Polymerization yield, 97%.

PREPARATION EXAMPLE 3

(Preparation of acrylate polymer in the presence of polyalkyleneoxide)

Polypropyleneoxide (75 g) prepared in Preparation Example 1 was charged in a 300 ml four-necked flask the interior of which flask was replaced with nitrogen, and gradually heated with stirring on an oil bath kept at 110° C. From the dropping funnel, a mixture of n-butyl acrylate (25 g), γ-methacryloxypropylmethyldimethoxysilane (0.07 g) and α,α'-azobisisobutyronitrile (0.25 g) was added over 2 hours. After the completion of the addition of the mixture, the reactive mixture was stirred for 1 hour to obtain a colorless transparent viscous liquid. Viscosity (23° C.), 540 poise. Polymerization yield, 97.5%.

EXAMPLES 1-9

To the organic polymer having the silicon-containing reactive group prepared in each Preparation Examples (100 parts), a specific tackifier resin shown in Table 1 was added and then a toluene solution of them having a solid content of 80% was prepared. To the solution, a curing catalyst shown in Table 1 was added and applied on a polyester substrate (Lumilar film manufactured by Toray Co., Ltd., Japan) of 25 μm in thickness with a coater to obtain a dried paste thickness of 25 μm and cured at 110° C. for 1 minute.

In Table 1, "YS polystar T-115 and S-145" are terpene-phenol resins manufactured by Yasuhara Oil and Fat Co., Ltd., Japan, and Steberite-ester 7 is a hydrogenated rosin ester resin manufactured by Hercules Inc.

COMPARATIVE EXAMPLES 1-5

In the same manner as in Example 1 but using a curing catalyst shown in Table 1, a solution was prepared and applied on the substrate.

Curing property of the polymer composition was evaluated according to the following criteria:

steel plate and peeled off, the cured polymer does not remain on the plate.

B: Although the polymer is cured to a great extent, the surface of the cured polymer is very sticky. When the cured polymer is adhered on a stainless steel plate and peeled off, the cured polymer does not remain on the plate.

C: The polymer composition is insufficiently cured so that when the cured polymer is adhered on a stainless steel plate and peeled off, a part of the polymer remains on the plate.

TABLE 1

| Example No. | Polymer | Curing catalyst Compound | Parts | Tackifier resin Compound | parts | Curing property |
|---|---|---|---|---|---|---|
| 1 | Prep. Ex. 1 | Dibutyltin bisacetylacetonate*1 | 3 | YS polystar T-115 | 80 | A |
| 2 | Prep. Ex. 1 | Dibutyltin dimethoxide*2 | 3 | YS polystar T-115 | 80 | A |
| 3 | Prep. Ex. 1 | Dibutyltin bisnonylphenoxide*3 | 3 | YS polystar T-115 | 80 | A |
| 4 | Prep. Ex. 1 | Dibutyltin monononylphenoxide*4 | 3 | YS polystar T-115 | 80 | A |
| 5 | Prep. Ex. 1 | Dibutyltin bisacetylacetonate | 3 | YS polystar S-145 | 80 | A |
| 6 | Prep. Ex. 1 | Dibutyltin bisacetylacetonate | 3 | Steberite-ester 7 | 80 | B |
| 7 | Prep. Ex. 1 | Dibutyltin bisacetylacetonate | 1.5 | YS polystar T-115 | 80 | B |
| 8 | Prep. Ex. 2 | Dibutyltin bisacetylacetonate | 3 | YS polystar T-115 | 40 | A |
| 9 | Prep. Ex. 3 | Dibutyltin bisacetylacetonate | 3 | YS polystar T-115 | 40 | A |
| Comp. Example No. | | | | | | |
| 1 | Prep. Ex. 1 | Dibutyltin dilaurate*5 | 3 | YS polystar T-115 | 80 | C |
| 2 | Prep. Ex. 1 | Dibutyltin dilaurate*5 | 5 | YS polystar T-115 | 80 | C |
| 3 | Prep. Ex. 1 | Tin dioctylate*6 | 3 | YS polystar T-115 | 80 | C |
| 4 | Prep. Ex. 2 | Dibutyltin dilaurate | 3 | YS polystar T-115 | 40 | C |
| 5 | Prep. Ex. 3 | Dibutyltin dilaurate | 3 | YS polystar T-115 | 40 | C |

Note
*1
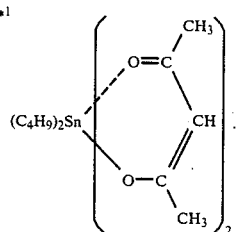

*2 $(C_4H_9)_2Sn(OCH_2)_2$.

*3
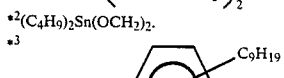

*4
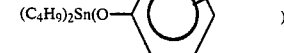
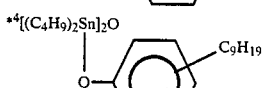

*5 $(C_4H_9)_2Sn(OCOC_{11}H_{23})_2$.
*6 $Sn(OCOC_7H_{15})_2$.

A: The composition is substantially completely cured and the surface of the cured polymer is not sticky. When the cured polymer is adhered on a stainless

EXAMPLES 10 AND 11

To polyalkyleneoxide having the silicon-containing reactive group prepared in Preparation Example 1, calcium carbonate, dioctyl phthalate, titanium dioxide, hydrogenated castor oil and, as an anti-aging agent, Noclack NS-6 (manufactured by Ohuchi-Shinko chemical Co., Ltd., Japan) in the predetermined amounts shown in Table 2 were added and mixed with removing water by azeotropic dehydration. Then, a curing catalyst was added with preventing contamination of water or moisture and again thoroughly mixed.

The curing time of the mixture, namely tack-free time defined in JIS (Japanese Industrial Standards) A-5758 was measured at 20±3° C. The curing time of the mixture after keeping it in a drier at 50° C. for 1 month was also measured. The results are shown in Table 3.

COMPARATIVE EXAMPLES 6 AND 7

In the same manner as in Example 11 but using dibutyltin dilaurate or tin dioctylate as the curing catalyst, the same procedures are repeated. The results are shown in Tables 2 and 3.

As is clear from Table 3, before keeping them in a dryer at 50° C. for 1 month, it took longer time for curing the compositions of Comparative Examples 6 and 7 than those of the present invention. In addition, the curing time of the compositions of Comparative Examples after keeping in a dryer became undesirably long.

TABLE 2

|  | Example No. | | Comp. Ex. No. | |
| --- | --- | --- | --- | --- |
|  | 10 | 11 | 6 | 7 |
| Polymer (Prep. Ex. 1) | 100 | 100 | 100 | 100 |
| Calcium carbonate | 150 | 150 | 150 | 150 |
| Dioctyl phthalate | 60 | 60 | 60 | 60 |
| Titanium dioxide | 30 | 30 | 30 | 30 |
| Hydrogenated castor oil | 4 | 4 | 4 | 4 |
| Noclack NS-6 | 0.5 | 0.5 | 0.5 | 0.5 |
| Dibutyltin diacetylacetonate | 2 | 3 | — | — |
| Dibutyltin dilaurate | — | — | 3 | — |
| Tin dioctylate | — | — | — | 3 |

TABLE 3

|  |  | Example No. | | Comp. Ex. No. | |
| --- | --- | --- | --- | --- | --- |
|  |  | 10 | 11 | 6 | 7 |
| Tack free time (hrs) | Before keeping in a dryer | 2.0 | 1.2 | 4.0 | 6.0 |
|  | After keeping in a dryer for 1 month at 50° C. | 2.0 | 1.2 | 8.0 | >12.0 |

EXAMPLES 12 AND 13

To polyalkyleneoxide having the silicon-containing reactive group prepared in Preparation Example 1, calcium carbonate, dioctyl phthalate, titanium dioxide, hydrogenated castor oil and as an anti-aging agent, Noclack NS-6 in the predetermined amounts shown in Table 4 were added and mixed with removing water by azeotropic dehydration. Then, a curing catalyst and, as an adhesivity improving agent, A1120 (N-(β-aminoethyl)-γ-aminopropyltrimethoxysilane manufactured by Nippon Unicar Co., Ltd., Japan) were added with preventing contamination of water or moisture and again thoroughly mixed.

The mixture was examined for tack-free time defined in Examples 10 and 11 on a substrate listed in Table 5 and then cured at 20° C. for 7 days, followed by examination of adhesivity. The results are shown in Table 5.

COMPARATIVE EXAMPLES 8 AND 9

In the same manner as in Example 12 but using dibutyltin dilaurate as the curing catalyst and laurylamine as a co-catalyst shown in Table 4, the same procedures are repeated. The results are shown in Table 5.

The composition containing dibutyltin dilaurate as the curing catalyst (Comparative Example 8) had high adhesive strength but a low curing rate. The composition containing a combination of dibutyltin dilaurate and laurylamine as the curing agent (Comparative Example 9) had a high curing rate but low adhesive strength.

TABLE 4

|  | Example No. | | Comp. Ex. No. | |
| --- | --- | --- | --- | --- |
|  | 12 | 13 | 8 | 9 |
| Polymer (Prep. Ex. 1) | 100 | 100 | 100 | 100 |
| Calcium carbonate | 100 | 100 | 100 | 100 |
| Dioctyl phthalate | 40 | 40 | 40 | 40 |
| Titanium dioxide | 25 | 25 | 25 | 25 |
| Hydrogenated castor oil | 4 | 4 | 4 | 4 |
| Noclack NS-6 | 0.5 | 0.5 | 0.5 | 0.5 |
| A1120 | 0.5 | 0.5 | 0.5 | 0.5 |
| Dibutyltin monononylphenolate | 2 | — | — | — |
| Dibutyltin diacetylacetonate | — | 2 | — | — |
| Dibutyltin dilaurate | — | — | 2 | 2 |
| Laurylamine | — | — | — | 1 |

TABLE 5

|  | Example No. | | Comp. Ex. No. | |
| --- | --- | --- | --- | --- |
|  | 12 | 13 | 8 | 9 |
| Tack free time (hrs.) | 0.5 | 0.4 | 4.0 | 0.8 |
| Adhesivity(*1) |  |  |  |  |
| Glass | A | A | A | B |
| Anodized aluminum | A | A | A | B |
| Acryl baked aluminum | A | A | A | B |
| Aluminum colored by electrolysis | A | A | A | C |
| Polyvinyl chloride coated steel plate | A | A | A | C |

Note
(*1)The composition was cured at 20° C. for 7 days and the cured composition (the coated film on the substrate) was peeled off from the substrate with fingers. The adhesivity was evaluated based on the state of failure as follows:
A: Cohesive failure of the cured composition.
B: Cohesive failure of the cured composition on about a half of the surface area of the substrate.
C: Failure at the interface between the cured composition and the substrate.

What is claimed is:

1. A curable polymer composition consisting essentially of
(A) 100 parts by weight of an organic polymer having a backbone selected from the group consisting of polymers of polyethers and polymers and copolymers of, vinyl compounds and diene compounds and 1.2 to 6 silicon-containing reactive groups on the average of the formula:

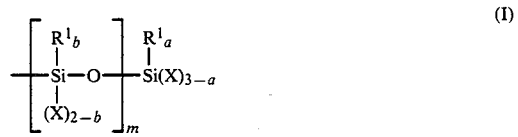

(I)

wherein $R^1$ is, the same or different, a $C_1$–$C_{20}$ monovalent hydrocarbon group or a triorganosiloxy group of the formula:

$$(R')_3SiO— \quad (II)$$

in which R' is, the same or different, a $C_1$–$C_{20}$ monovalent hydrocarbon group; X is a hydroxyl group or a hydrolyzable group provided that when the number of Xs in the group (I) is at least 2, Xs are the same or different; a is 0, 1, 2 or 3; b is 0, 1 or 2; and m is an integer of 1 to 18, and (B) 0.01 to 10 parts by weight of a curing catalyst selected from the compounds of the formulas:

$$Q_2Sn(OZ)_2 \quad (IIIa)$$

and

$$(IIIb)$$

wherein Q is a $C_1$–$C_{20}$ monovalent hydrocarbon group; and Z is, the same or different, a $C_1$–$C_{20}$ monovalent hydrocarbon group or an organic group having a functional residue which can form a coordinate bond with Sn atom.

2. A curable polymer composition according to claim 1, wherein the organic polymer (A) has a backbone chain comprising alkyleneoxide polymer which consists of repeating units of the formula:

$$—R^4—O—$$

wherein $R^4$ is a $C_1$–$C_8$, preferably $C_1$–$C_4$ divalent hydrocarbon group.

3. A curable polymer composition according to claim 1, wherein the organic polymer (A) has a molecular weight of 3,000 to 15,000.

4. A curable polymer composition according to claim 3, wherein the organic polymer (A) has the silicon-containing reactive group at the chain end of molecule.

5. A curable polymer composition according to claim 1, wherein the organic polymer (A) has a backbone chain comprising polyalkyl acrylate having 2 to 12 carbon atoms in the alkyl group.

6. A curable polymer composition according to claim 1, wherein the curing catalyst is a compound of the formula:

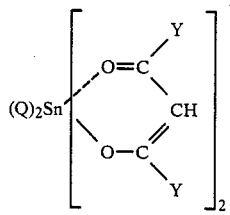

wherein Q is, the same or different, a $C_1$–$C_{20}$ monovalent hydrocarbon group; and Y is, the same or different, a $C_1$–$C_8$ hydrocarbon group, halogenated hydrocarbon group, cyanoalkoxy group, alkoxy group, halogenated alkoxy group, cyanolkoky group or amino group.

* * * * *